July 5, 1960
C. O. BRODERS
2,943,605
MAXIMUM PRESSURE SELECTOR
Filed July 28, 1958
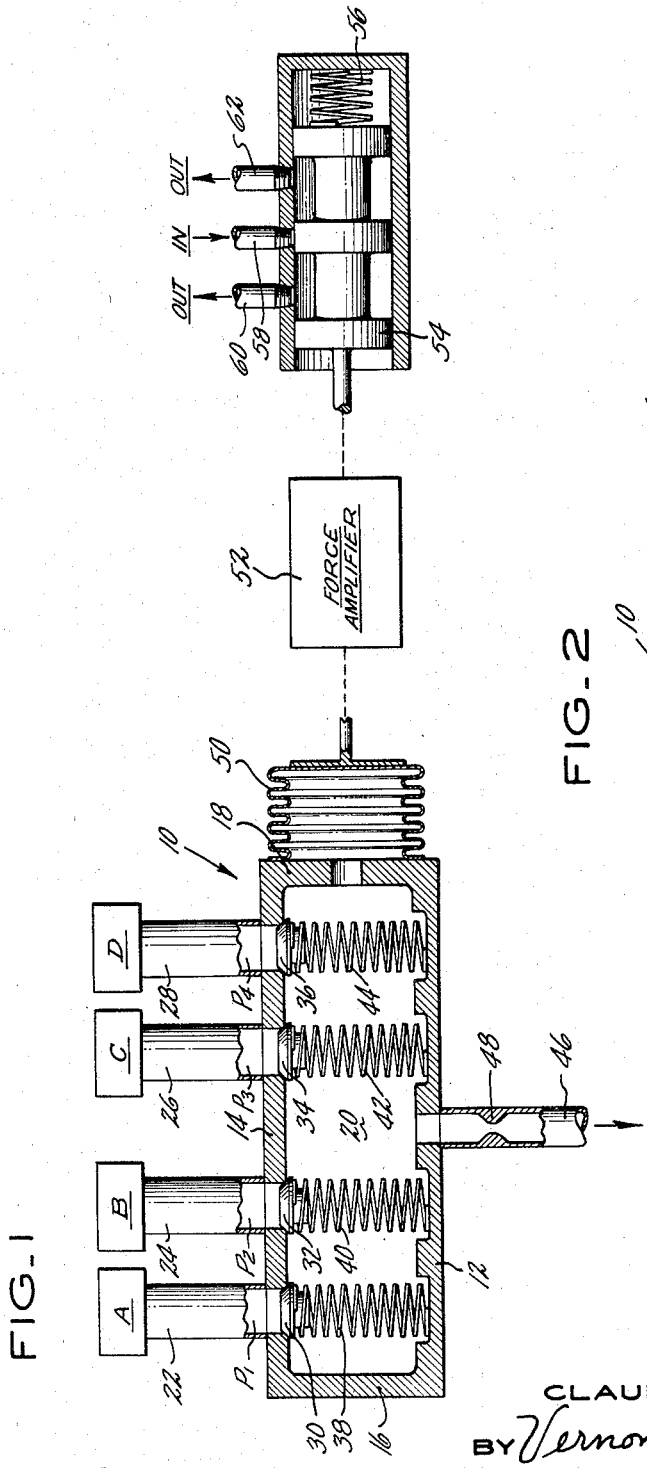
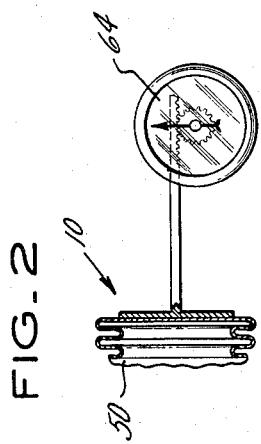
INVENTOR
CLAUDE O. BRODERS
BY Vernon F. Hauschild
ATTORNEY United States Patent Office 2,943,605
Patented July 5, 1960

2,943,605

MAXIMUM PRESSURE SELECTOR

Claude O. Broders, Simsbury, Conn., assignor to United Aircraft Corporation, East Hartford, Conn., a corporation of Delaware Filed July 28, 1958, Ser. No. 751,554

5 Claims. (Cl. 121—38)

This invention relates to apparatus for selecting the maximum pressure in a plurality of pressures.

It is an object of this invention to select the maximum of a plurality of pressures.

It is a further object of this invention to select the maximum of a plurality of pressures with provisions for indicating the amount of the maximum pressure.

It is a further object of this invention to select the maximum of a plurality of pressures with provisions for imparting a force, preferably for positioning a mechanism, as a function of the maximum pressure.

It is a further object of this invention to select the maximum of a plurality of pressures comprising a plurality of passages each blocked from communication with a common chamber by identical check valves and each subjected to different positions so that the maximum pressure will open its check valve to enter the common chamber, less the pressure drop across its check valve, and, once therein, will prevent the opening of the remainder of the check valves.

Other objects and advantages will be apparent from the specification and claims, and from the accompanying drawings which illustrate an embodiment of the invention.

Fig. 1 is an embodiment of my invention showing a maximum pressure selector which utilizes the pressure so selected to position a mechanism as a function thereof.

Fig. 2 is a fragmentary showing of my Fig. 1 embodiment but altered to perform the function of a maximum pressure indicator.

It is frequently desirable to determine the maximum of a series of fluid pressures, whether gas or liquid, and to use this maximum pressure, which may be a powerplant parameter, to actuate a control mechanism, such as a valve or lever, or to merely indicate the amount of the maximum pressure.

Referring to Fig. 1 we see maximum pressure selector switch 10 which comprises a plurality of joined walls such as 12, 14, 16 and 18 which define an enclosed chamber 20. A plurality of passages such as 22, 24, 26 and 28 are each in communication with chamber 20 and are each in communication with gas or liquid at different pressures such as $P_1$, $P_2$, $P_3$ and $P_4$ which emanate from different pressure sources, indicated generally as A, B, C and D. Check valves 30, 32, 34 and 36, which are preferably identical or so fabricated so as to be actuatable to an open or closed position at a particular and the same pressure drop thereacross, serve when closed to block communication between the plurality of passages 22, 24, 26 and 28 and common chamber 20. Springs 38, 40, 42 and 44 urge check valves 30, 32, 34 and 36, respectively, toward a closed position. Outflow passage 46, preferably with fixed restriction 48 therein, also communicates with chamber 20 and restricts the outflow of fluid therefrom. The outflow function is very important for small pressures. Pressure responsive expansion means 50, which is preferably an expandable bellows or diaphragm, is also in communication with chamber 20 so that it is subjected to or acted upon by the pressure prevalent in chamber 20.

By way of operation, each of the pressures $P_1$, $P_2$, $P_3$ and $P_4$ will impart a pressure to the check valves 30, 32, 34 and 36 in communication therewith and the maximum of pressures $P_1$, $P_2$, $P_3$ and $P_4$ will open its check valve and enter chamber 20 to establish the maximum of pressures $P_1$, $P_2$, $P_3$ and $P_4$ therein, since the pressure drop through the check valves and the outflow thru passage will be small, and will serve, by coacting with springs 38, 40, 42 and 44 to prevent the opening of the remainder of the check valves and hence prevent the admission of the lesser of pressures $P_1$, $P_2$, $P_3$ and $P_4$ from entering chamber 20. The pressure from the maximum of pressures $P_1$, $P_2$, $P_3$ and $P_4$, once within chamber 20, will enter expansion means 50 to cause expansion thereof and, as shown in Fig. 1, will preferably work through force amplifier 52 to position a control mechanism such as spool valve 54, which is biased by spring 56 and regulates flow of fluid from passage 58 to either passage 60 or 62, or as shown in Fig. 2, expands to actuate indicator 64, which may be a pointer dial rotated by rack-and-pinion, to indicate the amount of pressure within chamber 20.

Assume that pressure $P_3$ is the maximum pressure and that it therefore applies a greater force against check valve 34 than do pressures $P_1$, $P_2$ and $P_4$ against their respective check valves 30, 32 and 36. Under these circumstances, check valve 34 will open to permit the maximum pressure $P_3$ to enter chamber 20 and build up therein to coact with springs 38, 40, and 44 to prevent the opening of check valves 30, 32 and 36 so that expansion means 50 is caused to actuate or expand as a function of maximum pressure $P_3$. If pressure $P_4$ then becomes greater than pressures $P_1$, $P_2$ and $P_3$, check valve 36 will open, check valves 30, 32, and 34 will be closed and chamber 20 and expansion mechanism 50 will be subjected to the pressure $P_4$, which is now the maximum pressure. In like fashion, if pressures $P_1$ or $P_2$ should become maximum, their responsive check valves 30 or 32 will open, closing the remainder of the check valves and subjecting chamber 20 and expansion mechanism 50 to the pressures $P_1$ or $P_2$.

It is to be understood that the invention is not limited to the specific embodiment herein illustrated and described but may be used in other ways without departing from its spirit as defined by the following claims.

I claim:

1. A maximum pressure selector comprising a chamber, a plurality of passages each communicating with said chamber and adapted to communicate with a different pressure source, flow blockage means actuatable at a selected pressure differential blocking communication between each of said passages and said chamber, and pressure responsive means communicating with said chamber and responding to the pressure therein.

2. A maximum pressure selector comprising a chamber, a plurality of passages each communicating with said chamber and adapted to communicate with a different pressure source, outlet means communicating with said chamber and adapted to provide restricted outflow therefrom, flow blockage means actuatable at a selected pressure differential blocking communication between each of said passages and said chamber, and pressure responsive means communicating with said chamber and responding to the pressure therein.

3. A maximum pressure selector comprising joined walls forming a chamber, a plurality of passages each communicating with said chamber and with a different pressure source, outlet means communicating with said chamber and having a fixed restriction therein restricting outflow from said chamber, a check valve blocking communication between each of said passages and said chamber, each of said check valves actuatable at the same pressure differential so that the pressure from the maximum of said pressure sources will open the check valve in the passage with which it communicates and enter said chamber and prevent the opening of the check valves which block communication between said chamber and the remainder of said pressure sources, and pressure responsive means communicating with said chamber and responding to the pressure therein.

4. A maximum pressure selector comprising joined walls forming a chamber, a plurality of passages each communicating with said chamber and with a different pressure source, outlet means communicating with said chamber and having a fixed restriction therein restricting outflow from said chamber, a spring loaded check valve blocking communication between each of said passages and said chamber, each of said check valves actuatable at the same pressure differential so that the pressure from the maximum of said pressure sources will open the check valve in the passage with which it communicates and enter said chamber and prevent the opening of the check valves which block communication between said chamber and the remainder of said pressure sources, and expansion bellows communicating with said chamber and expanding in response to the pressure therein.

5. A maximum pressure selector comprising a chamber, a plurality of passages communicating with said chamber, a spring loaded check valve blocking communication between each of said passages and said chamber, an outlet flow line with a fixed restriction therein providing restricted outflow from said chamber, each of said check valves actuatable at the same pressure differential so that when each is subjected to a different pressure the maximum pressure will actuate one of said check valves to enter said chamber therethrough and act to prevent the opening of the remainder of said check valves, and expandable bellows communicating with said chamber to be expanded by said maximum pressure.

References Cited in the file of this patent

UNITED STATES PATENTS

| | | |
|---|---|---|
| 1,266,627 | Renne | May 21, 1918 |
| 1,960,158 | Lehmann | May 22, 1934 |
| 2,451,013 | Ziskal | Oct. 12, 1948 |